March 24, 1970 R. B. CAVANAGH 3,503,018
TUNING OF RECEIVERS SUCH AS RADIO OR TELEVISION RECEIVERS
USING TRIGGER DEVICES FOR SELECTION
Filed Dec. 18, 1967 2 Sheets-Sheet 1

INVENTOR.
ROBERT B. CAVANAGH
BY
P. W. [signature]
PATENT AGENT

March 24, 1970 R. B. CAVANAGH 3,503,018

TUNING OF RECEIVERS SUCH AS RADIO OR TELEVISION RECEIVERS USING TRIGGER DEVICES FOR SELECTION

Filed Dec. 18, 1967 2 Sheets-Sheet 2

INVENTOR.
ROBERT B. CAVANAGH

BY

PATENT AGENT 3,503,018
Patented Mar. 24, 1970

3,503,018

TUNING OF RECEIVERS SUCH AS RADIO OR TELEVISION RECEIVERS USING TRIGGER DEVICES FOR SELECTION

Robert B. Cavanagh, New Hamburg, Ontario, Canada, assignor to Electrohome Limited, North Kitchener, Ontario, Canada Filed Dec. 18, 1967, Ser. No. 691,611
Int. Cl. H03j 3/06
U.S. Cl. 334—15 8 Claims

ABSTRACT OF THE DISCLOSURE

A receiver having a tuner of a type that is adapted to tune itself automatically to different signal frequencies in response to application to the tuner of input signals at different levels has selector means for deriving the input signals. The selector means include at least first and second circuits including first and second trigger devices respectively for changing the conductivity of the respective circuits from one condition to the opposite condition in response to selection of a circuit. Means responsive to the changes in conductivity of the respective circuits derive two such input signals at different levels, these input signals being supplied to the tuner. The two circuits are interconnected for rendering one circuit into one condition of conductivity when the other circuit is in the opposite conductivity condition.

This invention is related to the invention disclosed in my copending application Ser. No. 693,053 filed Dec. 18, 1967.

This invention relates to channel or station selector circuits for television or radio receivers and to television or radio receivers employing such circuits. More particularly, this invention relates to channel selector circuits for television receivers of a type employing varactor tuners or other tuners that are adapted to tune themselves automatically to different frequencies allocated to different television channels in response to application to the tuners of input signals at different levels.

While this invention will be disclosed hereinafter in connection with its use in a television receiver, those skilled in the art will appreciate that it is readily capable of being used with a radio receiver employing such a tuner, or, indeed, with any other type of receiver employing such a tuner and that is capable of receiving signals having different carrier frequencies and reproducing the intelligence-containing information modulated thereon.

Concentional television receivers commonly are provided with a manually operated tuner having a single control knob that is manually rotated by the user to select any desired channel. Some television receivers have tuners that are operated by stepping motors. With such a receiver a remote control unit may be provided, and the user can select any desired channel by pressing a push button on the remote control unit, thereby causing the stepping motor to operate and the tuner to advance from one channel to the next channel with each depression of the push button.

In the aforesaid application there are disclosed, for use with receivers having rotatable tuners, channel selector circuits that possess memory, the circuits being so designed that the tuner automatically will seek after and stop at the channel selected.

A varactor tuner is, in a sense, operated electrically, as opposed to mechanically. It employs variable capacitance diodes. Different voltages corresponding to different channels to which the receiver can be tuned are selectively applied to the tuner. The capacitance of the variable capacitance diodes, and hence the tuning of the receiver, changes with the magnitude of the voltage applied to the tuner. Thus, when the receiver is to be tuned to, say channel 2, a certain predetermined voltage will be applied to the tuner. This will result in the variable capacitance diodes exhibiting a certain capacitance, and this, in turn, will result in tuning of the receiver to channel 2. When, say, channel 4 is selected, a voltage at a different predetermined level will be applied to the tuner, a predictable change in capacitance of the variable capacitance diodes will result, and the receiver will tune itself to channel 4.

While, as aforementioned, a varactor type tuner is operated electrically, as opposed to mechanically, in the sense that electrical signals are employed for the purpose of changing the tuning of the tuner, varactor type tuners are operated mechanically in the sense that they employ mechanically interlocked, pushbutton switches, which, when depressed, cause the aforementioned predetermined voltages to be applied to the varactor tuner.

In accordance with the instant invention, channel selector circuits are provided for a varactor type tuner, the channel selector circuits being of a type that render it unnecessary to employ mechanically interlocked switches, which are relatively expensive and subject to wear and mechanical failure. In a preferred embodiment, touch type switches with the attendant advantages of low cost, soundless operation and the elimination of movable switch contacts are employed. One channel selector circuit is provided for each channel to which the receiver is adapted to be tuned. Each channel selector circuit includes a trigger device for changing the conductivity of the circuit from one condition to the opposite condition, and means responsive to the change in the conductivity of the circuit from the one condition to the opposite condition for deriving an input signal for the varactor type tuner, the various circuits being so designed that each input signal is at a different level. The channel selector circuits are interconnected so that all but one of the circuits is maintained in the one conductivity condition when that one circuit is in the opposite conductivity condition. Means are provided for applying the various input signals to the tuner.

This invention will be come more apparent from the following detailed description, taken in conjunction with the appended drawings, in which.

Figure 1:
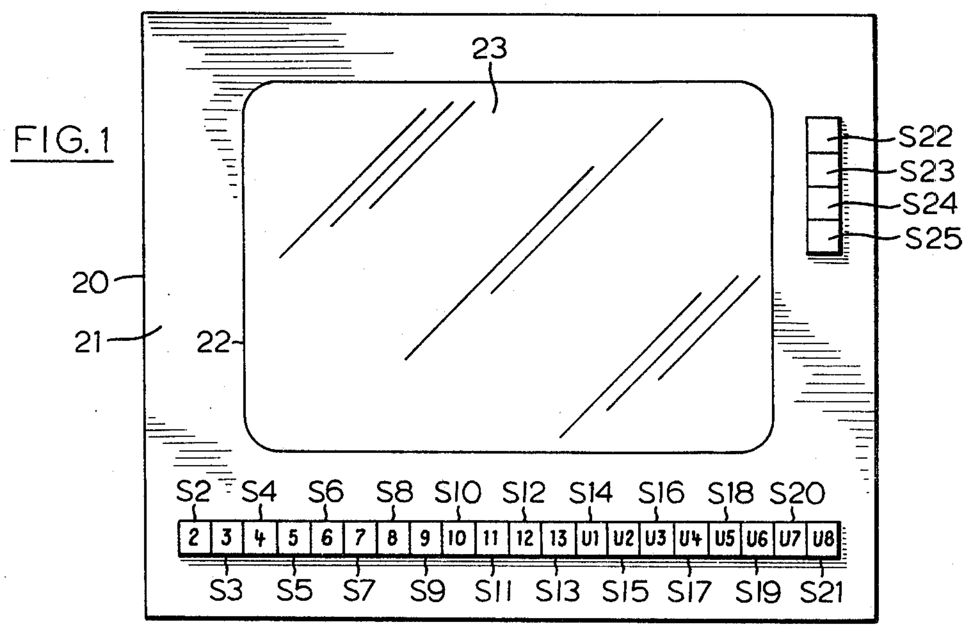
FIGURE 1 is a front view of a televison receiver embodying this invention.

With reference to FIGURE 1, there is shown a television receiver 20 having a front panel 21 with an opening 22 therein in which is located the screen 23 of the picture tube of the receiver. Disposed below opening 22 are a plurality of switches S2, S3, S4, S5, S6, S7, S8, S9, S10, S11, S12, S13, S14, S15, S16, S17, S18, S19, S20 and S21 that may be touch type or mechanical type switches. Switches S2 to S13 inclusive are employed for the selection of VHF channels 2 to 13 respectively, while switches S14 to S21 inclusive are employed for the selection of UHF channels U1 to U8 inclusive. Positioned to one side of opening 22 are additional switches S22, S23, S24 and S25 for controlling power, volume, vertical hold, fine tuning, etc.

Figure 2:
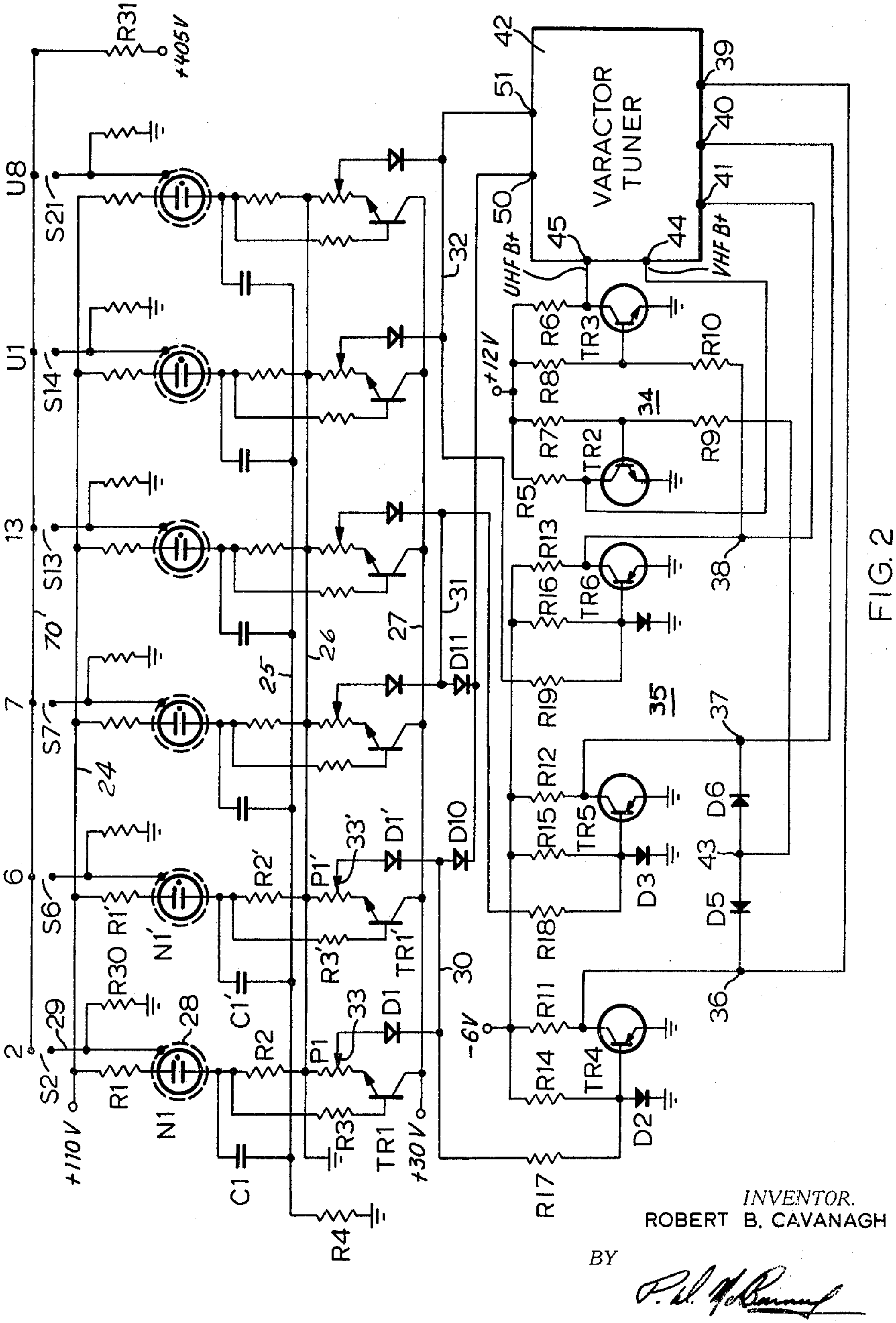
FIGURE 2 is a circuit diagram showing in part a channel selector system embodying this invention and two other circuits that are employed when a varactor type tuner is used.

With reference now to FIGURE 2, there is shown a channel selector system embodying this invention. The system is made up of a plurality of channel selector circuits. The circuits for the selection of VHF channels 2, 6, 7 and 13 and UHF channels U1 and U8 are shown in FIGURE 2. It is to be understood that for each channel to which the receiver is capable of being tuned there will be a channel selector circuit of exactly the same type as shown in FIGURE 2 for the selection of channel 6, for example, but the channel selector circuits for channels 3 to 5, 8 to 12, and U2 to U7 have been omitted from FIGURE 2 for the sake of clarity. As shown in FIGURE 2, the channel selector circuit for channel 2 consists of resistors R1, R2 and R3, a potentiometer P1, a neon tube N1, a capacitor C1, a transistor TR1 and a diode D1. The channel selector circuit for channel 6 consists of resistors R1′, R2′ and R3′, a potentiometer P1′, a capacitor C1′, a neon tube N1′, a transistor TR1′ and a diode D1′. The corresponding components in the channel selector circuits are identical to each other, this being true for all channel selector circuits, not merely the channel selector circuits for channels 2 and 6.

Five bus bars 24, 25, 26, 27 and 70 are provided. Bus bar 24 is connected to a suitable source of positive DC potential at, say, +110 volts. Bus bar 25 is connected via a resistor R4 to ground. Bus bar 26 is connected to ground. Bus bar 27 is connected to a suitable source of positive DC potential at, say, +30 volts. Bus bar 70 is connected via a large resistor R31 to a suitable source of positive DC potential at, say, +405 volts and having a high internal impedance.

The connection of each channel selector circuit to the various bus bars is the same and therefore will be described only with reference to the connection of the channel selector circuit for channel 2 to the bus bars. Resistor R1 is connected between bus bar 24 and one electrode of neon tube N1. The other electrode of neon tube N1 is connected via resistor R2 to bus bar 26. This other electrode of neon tube N1 also is connected via capacitor C1 to bus bar 25. The electrode of neon tube N1 connected via resistor R2 to bus bar 26 additionally is connected via resistor R3 to the base electrode of transistor TR1. Potentiometer P1 is connected between bus bar 26 and the emitter electrode of transistor TR1, while the collector electrode of the transistor is connected to bus bar 27.

Each neon tube is provided with a capacitive firing shield 28. If the various switches S2 to S21 of FIGURE 1 are touch type switches, they each will have a contact connected to bus bar 70, as shown in FIGURE 2, the other contacts of the switches being connected via conductors 29 to the shields 28 of the neon tubes in their respective channel selector circuits. A resistor R30 is connected between shield 28 and ground for discharging the shield.

Three additional bus bars 30, 31 and 32 are provided. The slider 33 of potentiometer P1 is connected via diode D1 to bus bar 30, just as the slider 33′ of potentiometer P1′ is connected via diode D1′ to bus bar 30. It is to be understood that the channel selector circuits for channels 3, 4 and 5 also have the sliders of their potentiometers connected via their diodes to bus bar 30. The sliders of the potentiometers in the channel selector circuits for channels 7 to 13 inclusive are connected to bus bar 31 via their diodes, while the sliders of the potentiometers in the channel selector circuits for channels U1 to U8 inclusive are connected via their diodes to bus bar 32.

Also shown in FIGURE 2 is a B+ switching network generally designated 34. It consists of two transistors TR2 and TR3 and resistors R5, R6, R7, R8, R9 and R10. Resistor R5 is connected between the collector electrode of transistor TR2 and a source of positive DC potential, B+, e.g., +12 volts, while resistor R6 is connected between B+ and the collector electrode of transistor TR3. Resistor R7 is connected between the base electrode of transistor TR2 and B+, while resistor R8 is connected between the base electrode of transistor TR3 and B+. Resistors R9 and R10 are connected to the base electrodes of transistors TR2 and TR3 respectively. The emitter electrodes of the two transistors are grounded.

In a varactor tuner there is a VHF section, which is in two parts, and a UHF section. When the receiver is tuned to a VHF station B+ is applied to the VHF section, but not to the UHF section, whereas, when the receiver is tuned to a UHF station, B+ is applied to the UHF section, but not to the VHF section. B+ switching network 34 performs the function of appropriately switching B+ from the UHF to the VHF section and vice versa.

A varactor type tuner has two sections, a VHF section and a UHF section, the former having upper and lower parts. When the tuner is tuned to any one of channels 2 to 6, the lower VHF section is employed. When it is tuned to any one of channels 7 to 13, the upper VHF section is employed, while the UHF section is employed when the tuner is tuned to any one of UHF channels U1 to U8. The circuit shown in FIGURE 2 and generally designated 35 is a switching circuit that accomplishes range switching functions, i.e. that ensures that the correct section of the varactor tuner is employed dependent upon the channel to which the tuner is to be tuned. The switching circuit includes three identical transistors TR4, TR5 and TR6. The emitter electrodes of these three transistors are grounded, while their collector electrodes are connected via resistors R11, R12 and R13 respectively to a suitable source of negative DC potential at, say, −6 volts. Resistors R14, R15 and R16 are connected between the negative DC source and the base electrodes of transistors TR4, TR5 and TR6 respectively. Diodes D2, D3 and D4 are connected between ground and the base electrodes of transistors TR4, TR5 and TR6 respectively. Range switching signals appear at output terminals 36, 37 and 38 connected to the collector electrodes of transistors TR4, TR5 and TR6 respectively. The range switching signals that appear at these output terminals are applied to terminals 39, 40 and 41 respectively of a varactor tuner 42.

Diodes D5 and D6 are connected back to back between terminals 36 and 37, their common terminal 43 providing another output terminal. Switching signals for network 34 are applied from terminals 38 and 43 of network 35 to network 34 via resistors R10 and R9 respectively.

Input signals to switching circuit 35 are applied from bus bars 30, 31 and 32 via resistors R17, R18 and R19 respectively to the base electrodes of transistors TR4, TR5 and TR6 respectively.

The operation of switching circuit 35 is such that in the absence of any input signal applied to any one of transistors TR4, TR5 and TR6, each transistor will be turned on, and output terminals 36, 37 and 38 will be at essentially ground potential. However, when an input signal is applied to the base electrode of one of the transistors, that transistor will turn off causing a negative voltage to appear at the one of terminals 36, 37 and 38 connected to its collector electrode and to be applied to the corresponding one of terminals 39, 40 and 41.

The operation of the channel selector system now will be discussed. For the purpose of discussion, it will be assumed that the receiver is not tuned to any channel, and that it is desired to tune the receiver to channel 2. This is accomplished simply by placing one's finger between the contacts of switch S2. This causes a high DC potential to be applied to shield 28 of neon tube N1. The resultant electric field between shield 28 and the anode of neon tube N1 cause ionization of the neon gas in the tube, and conduction of the neon tube results. In this respect, it must be understood that the positive DC voltage on bus bar 24 is itself unable to break down any of the neon tubes in the various channel selector circuits, but it is sufficient to sustain conduction of a neon tube after it has been triggered. The result of conduction of neon tube N1 will be the development of a voltage across resistor R2. This voltage will be applied to the base electrode of transistor TR1 via resistor R3 causing this transistor, which previously had been turned off, to turn on. Consequently, a positive voltage having a magnitude that is determined by the setting of slider 33 will be developed across the portion of potentiometer P1 between slider 33 and ground and will be applied via diode D1 to bus bar 30. This voltage will be a positive voltage because of bus bar 27 being connected to a +30 volt supply. The voltage delivered to bus bar 30 will be of the magnitude that is required, when applied via a diode D10 to the VHF tuning input terminal 50 of tuner 42, to cause varactor tuner 42 to tune itself automatically to channel 2. It will be prevented from appearing on bus bar 31 by a diode D11. It will be noted that diode D10 is connected between bus bar 30 and VHF tuning input terminal 50, while diode D11 is connected between bus bar 31 and VHF tuning input terminal 50. Bus bar 32 is connected to the UHF input terminal 51 of varactor tuner 42.

Tuner 42 now is tuned to channel 2. Assume that now it is desired to tune the receiver to channel 6. This is accomplished by bridging the contacts of switch S6, thereby triggering neon tube N1′ into conduction. As soon as conduction takes place, a positive pulse will be coupled via capacitor C1′ to bus bar 25. This positive pulse will be coupled to the lower electrode of neon tube N1 via capacitor C1 and should be of sufficient magnitude to cause neon tube N1 to cease conduction. The positive pulse also is applied to the other neon tubes of the other channel selector circuits but without causing any result, because these other neon tubes will not be conducting. A positive voltage will be developed across resistor R2′ and will be supplied to the base electrode of transistor TR1′ via resistor R3′ causing transistor TR1′ to turn on. Slider 33′ of potentiometer P1′ is set slightly different than slider 33, so that a different voltage will be applied via diode D1′ to bus bar 30 than was previously applied to bus bar 30 via diode D1. The voltage that will be applied via diode D1′ to bus bar 30 will be of a predetermined magnitude dependent on the setting of slider 33′ and will be the correct voltage to cause varactor tuner 42 to tune itself to channel 6. It will be applied to VHF tuning input terminal 50 via diode D10.

If it is desired to tune to any one of channels 7 to 13, the appropriate switch is touched, a predetermined voltage will be delivered to bus bar 31, and this voltage will be applied via diode D11 to VHF input terminal 50. Similarly, if it is desired to tune to a UHF channel, the appropriate one of switches S14 to S21 is touched, a voltage of predetermined magnitude will be applied to bus bar 32 and then to UHF tuning input terminal 51.

It will be understood that the settings of the sliders of the various potentiometers of the channel selector circuits are all different from each other, so that different voltages will be delivered to the various bus bars when different switches are touched, and that these different voltages are of predetermined magnitude and of the magnitude required to cause tuner 42 to tune itself to the desired channel.

Diode D1 provides isolation for the channel selector circuit for channel 2. Thus, when switch S6 is touched causing a positive voltage to be supplied via diode D1′ to bus bar 30, this positive voltage is prevented by diode D1 from being applied to the channel selector circuit for channel 2.

When the receiver first is turned on, transistors TR4, TR5 and TR6 will turn on, and no range switching voltage will be developed at any of terminals 36, 37 and 38. Assume now that the receiver is being tuned to channel 2. Touching of switch S2 will result in a positive voltage appearing on bus bar 30 in the manner previously described. This will result in a positive voltage being applied via resistor R17 to the base electrode of transistor TR4. This pulse will turn transistor TR4 off. Thus, a negative range switching voltage will be developed at output terminal 36 and will be applied to input terminal 39 for selection of the lower VHF section of tuner 42. If any one of switches S7 to S13 had been touched, the resultant voltage applied to the base electrode of transistor TR5 from bus bar 31 via resistor R18 would have turned off transistor TR5 causing a negative range switching voltage to be developed at output terminal 37 and applied to terminal 40, thereby causing selection of the upper VHF section of tuner 42. Similarly, had any one of switches U1 to U8 been selected, a negative range switching voltage would be applied to input terminal 41 resulting in the selection of the UHF section of tuner 42. Diodes D2, D3 and D4 clamp the voltages applied to the base electrodes of transistors TR4, TR5 and TR6 respectively when these voltages exceed the forward voltage drops of the respective diodes.

When the receiver first is turned on, both of transistors TR2 and TR3 will turn on, and the collector electrodes of both transistors will be essentially grounded. When channel 2 is selected, a negative voltage will appear at output terminal 36 as previously described. This negative voltage will be applied to the base electrode of transistor TR2 via diode D5, and resistor R9 causing transistor TR2 to turn off. Under these circumstances, B+ will be applied to the VHF B+ terminals 44 of tuner 42 via resistor R5.

If any one of switches S7 to S13 had been touched, a negative voltage would have appeared at output terminal 37, and this negative voltage would have been applied via diode D6 and resistor R9 to the base electrode of transistor TR2, again resulting in the application of B+ to VHF B+ input terminal 44.

If any one of switches S14 to S21 had been touched, a negative voltage would have resulted at output terminal 38, and this negative voltage would have been applied to the base electrode of transistor TR3 via resistor R10. This would result in turning off of transistor TR3, so B+ would be applied via resistor R6 to UHF B+ input terminal 45 of tuner 42.

One advantage of the type of channel selector circuit shown in FIGURE 2 is that during each operation and repeated operation of the circuit, the voltage delivered to bus bars 30, 31 and 32 will be relatively constant, this being due to the fact that the collector-emitter voltage drop of a transistor remains essentially constant during the life of the transistor.

Figure 3:
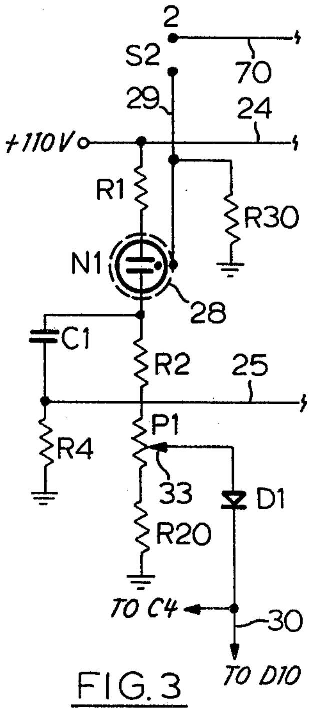
FIGURES 3, 4 and 5 are circuit diagrams of different channel selector circuits embodying this invention.

In FIGURE 3 there is shown a channel selector circuit constituting a different embodiment of this invention. This circuit has the advantage over those shown in FIGURE 2 that it does not require a transistor. However, it does have the disadvantage of requiring relatively expensive neon tubes to be used. In this respect, generally speaking the voltage drop across a neon tube will fluctuate fairly rapidly. As will become more apparent hereinafter, in the circuit of FIGURE 3, the voltage appearing at slider 33 is quite dependent upon the magnitude of the voltage drop across neon tube N1, whereas, this is not the case in the system of FIGURE 2. Thus, with the circuit of FIGURE 3, it may be necessary to employ a relatively expensive neon tube to ensure that the voltage drop across it remains substantially constant.

The circuit of FIGURE 3, as aforementioned, has no transistor TR1. Instead of the transistor, a resistor R20 is connected between potentiometer P1 and ground. When switch S2 is touched, neon tube N1 will fire, and a voltage will be developed between slider 33 and ground and applied via diode D1 to bus bar 30. Provided that a good quality neon tube is employed, the magnitude of this voltage will be wholly predictable and substantially constant and will be of the correct magnitude to cause the tuner to tune itself to channel 2.

It is important to the operation of the selector circuit of FIGURE 3 that the DC power supply connected to bus bar 24 be carefully regulated, because, if the DC voltage on bus bar 24 varies, so will the voltage picked off by slider 33, and incorrect tuning of the receiver may result. For the same reason, the DC voltage on bus bar 27 in the system of FIGURE 2 should be carefully regulated.

The channel selector circuit of FIGURE 3, like the channel selector circuits of FIGURE 2, employs a capacitor connected between bus bar 25 and one electrode of the neon tube to couple a neon tube extinguishing voltage from bus bar 25 to neon tube N1 when some channel other than channel 2 is selected. In the modified channel selector circuit shown in FIGURE 4, capacitor C1 has been eliminated and its function assumed by switch S2. Switch S2 is a three position switch having a movable contact 52 and three fixed contacts 53, 54 and 55. Contact 55 is grounded. Contact 54 is connected via a resistor R21 to a source of positive DC potential, say +150 volts, of sufficient magnitude to trigger neon tube N1. Movable contact 52 is connected to one electrode of neon tube N1, and this electrode also is connected via a resistor R22 to a source of positive DC potential of sufficient magnitude to sustain conduction of neon tube N1 but not to trigger the neon tube. This source of DC potential may produce a positive voltage of, say, 100 volts.

Figures 4, 5:
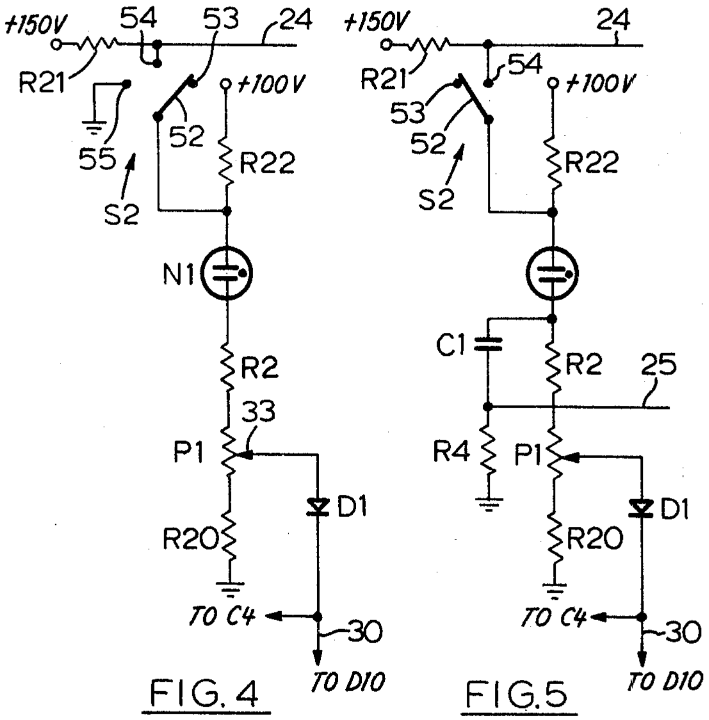

In order to describe the operation of the channel selector circuit of FIGURE 4, assume that the receiver is tuned to channel 6. Under these circumstances, the neon tube in the channel selector circuit for channel 6 will be conducting, and switch S6 in the channel 6 selector circuit will be in the open position, i.e., the same position as switch S2 of FIGURE 4. In order to tune the receiver to channel 2, movable contact 52 is momentarily engaged with fixed contact 55. This will result in a sufficiently large current being drawn from the 100 volt power supply to drop the output voltage of the power supply, by virtue of the IR drop in its internal impedance, to a value insufficient to sustain conduction of the neon tube in the channel selector circuit for channel 6, so this neon tube will be extinguished, thereby opening the channel selector circuit for channel 6. Movable contact 52 then is momentarily engaged with contact 54 resulting in immediate triggering of neon tube N1. Conduction of neon tube N1 will be sustained from the 100 volt power supply after movable contact 52 disengages from contact 54 and switch S2 assumes the open circuit position of FIGURE 4. A voltage of the proper magnitude for tuning to channel 2 will be developed between slider 33 and ground and applied via diode D1 to bus bar 30.

In the circuit of FIGURE 4, switch S2 is a mechanically operated switch and is of the type that normally is spring biased to the position shown in FIGURE 4. The engagement of movable contact 52 with fixed contacts 55 and 54 is only momentary.

In the modified circuit of FIGURE 5, capacitors again are used for applying extinguishing potentials to the neon tubes, and a two position switch S2 is employed. In operation, when it is desired to tune to channel 2, contacts 52 and 54 are momentarily closed applying a triggering potential to neon tube N1 and an extinguishing potential via capacitors C1, bus bar 25 and the corresponding capacitors of the other channel selector circuits to each other neon tube. When movable contact 52 is returned to the open circuit position of FIGURE 5, conduction of the channel selector circuit for channel 2 is sustained from the 100 volt power supply. As in the circuit of FIGURE 4, switch S2 normally is spring biased to the open circuit position, and only momentary contact is made between contacts 52 and 54.

Many other variations of the channel selector circuits shown in FIGURES 2 to 5 are possible. Thus, other trigger devices, such as silicon controlled rectifiers or diacs, could be substituted for the neon tubes. In general, any trigger devices could be substituted for the neon tubes. As used herein, the term trigger device is intended to mean any device that sustains conduction therethrough after breakdown at a lower voltage than the voltage across the device at breakdown. However, the use of neon tubes is particularly desirable, because they also can be used to provide a visual indication of the selected channel. Thus, the various switches S1 to S21 may have cover plates that are transparent in parts, e.g., the cover plates may be opaque with the numerals designating the channel associated with that switch being transparent. The neon tubes then may be located behind these cover plates and will illuminate the numeral associated with the switch that has been depressed or touched, and the neon tubes will remain illuminated until a difference channel is selected or the receiver turned off.

While the embodiments of this invention illustrated in FIGURES 2 to 5 rely upon conduction of a neon tube to cause the development of a particular voltage to be applied to tuner 42, it will be appreciated readily that the opposite could be the case without departing from this invention. Thus, a channel selector system embodying this invention can employ channel selector circuits that become non-conductive when selected, and this change in state of conductivity relied upon to develop or initiate the development of the required voltage.

While preferred embodiments of this invention have been disclosed herein, those skilled in the art will appreciate that changes and modifications may be made therein without departing from the spirit and scope of this invention as defined in the appended claims.

What I claim as my invention is:

1. In combination with a receiver having a tuner of a type that is adapted to tune itself automatically to different signal frequencies in response to application to said tuner of input signals at different levels; selector means for deriving said input signals, said selector means comprising first and second circuits, a first trigger device in said first circuit for changing the conductivity of said first circuit from one condition to the opposite condition in response to selection of said first circuit, first means responsive to a change in conductivity of said first circuit from said one condition to said opposite condition for deriving a first one of said input signal at a first level, said first means comprising a first transistor having base, collector and emitter electrodes, a first resistor connected in series circuit with said collector and emitter electrodes of said first transistor and means for applying a voltage derived from said first circuit when said first circuit is in said opposite condition to said base electrode of said first transistor to render said first transistor conductive, a second trigger device in said second circuit for changing the conductivity of said second circuit from said one condition to said opposite condition in response to selection of said second circuit and second means responsive to a change in conductivity of said second circuit from said one condition to said opposite condition for deriving a second one of said input signals at a second level, said second level being different from said first level, said second means comprising a second transistor having base, collector and emitter electrodes, a second resistor connected in series circuit with said collector and emitter electrodes of said second transistor and means for applying a voltage derived from said second circuit when said second circuit is in said opposite condition to said base electrode of said second transistor to render said second transistor conductive; means for interconnecting said first and second circuits for rendering said second circuit into said one condition in response to selection of said first circuit and said first circuit into said one condition in response to selection of said second circuit; and means for applying said first and second signals to said tuner.

2. The invention according to claim 1 wherein said trigger devices are neon tubes.

3. The invention according to claim 1 wherein said means for interconnecting said first and second circuits comprise means electrically interconnecting said first and second circuits for applying to a conductive one of said trigger devices a potential sufficient to render said conductive one of said trigger devices non-conductive in response to conduction of the other of said trigger devices.

4. The invention according to claim 3 wherein said means interconnecting said first and second circuits comprise capacitors interconnecting said first and second trigger devices.

5. The invention according to claim 4 wherein said trigger devices are neon tubes.

6. The invention according to claim 1 wherein said first and second circuits include third and fourth resistors respectively across which said voltages are derived, said third resistor being connected in series with said first trigger device, said fourth resistor being connected in series with said second trigger device.

7. The invention according to claim 6 wherein said trigger devices are neon tubes.

8. The invention according to claim 7 wherein said means for interconnecting said first and second circuits comprise means electrically interconnecting said first and second circuits for applying to a conductive one of said trigger devices a potential sufficient to render said conductive one of said trigger devices non-conductive in response to conduction of the other of said trigger devices.

References Cited

UNITED STATES PATENTS

| | | | |
|---|---|---|---|
| 2,544,683 | 3/1951 | Hoeppner et al. | 328—152 |
| 2,867,723 | 1/1959 | Spaulding | 328—154 X |
| 2,927,247 | 3/1960 | Hennis | 307—253 X |
| 3,025,411 | 3/1962 | Rumble | 307—203 |
| 3,051,847 | 8/1962 | Niemeyer | 307—253 |
| 3,054,985 | 9/1962 | Mason | 307—253 X |
| 3,103,637 | 9/1963 | Pan | 334—15 X |
| 3,113,240 | 12/1963 | Perkins et al. | 315—340 X |
| 3,160,765 | 12/1964 | Krossa | 307—253 |
| 3,256,462 | 6/1966 | Bauman | 315—340 X |
| 3,290,515 | 12/1966 | Procter | 315—84.5 X |
| 3,354,397 | 11/1967 | Wittig | 325—459 |
| 3,376,510 | 4/1968 | Rümmer | 334—3 X |
| 3,391,347 | 7/1968 | Bosse et al. | 334—55 X |
| 3,413,554 | 11/1968 | Yates et al. | 325—464 X |

FOREIGN PATENTS

| | | |
|---|---|---|
| 264,307 | 5/1964 | Australia. |

HERMAN KARL SAALBACH, Primary Examiner

W. H. PUNTER, Assistant Examiner

U.S. Cl. X.R.

307—241; 325—455, 461, 464; 334—55, 87